(12) United States Patent
Neill et al.

(10) Patent No.: US 7,671,803 B2
(45) Date of Patent: Mar. 2, 2010

(54) WIRELESS COMMUNICATION SYSTEM

(75) Inventors: Timothy Neill, Houston, TX (US); Robin Castell, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1388 days.

(21) Appl. No.: 10/627,316

(22) Filed: Jul. 25, 2003

(65) Prior Publication Data
US 2005/0020214 A1 Jan. 27, 2005

(51) Int. Cl.
*H01Q 1/38* (2006.01)

(52) U.S. Cl. .............................. 343/700 MS; 343/368; 343/777; 343/860

(58) Field of Classification Search ................ 343/702, 343/700 MS, 846, 850, 720, 905, 841, 848, 343/805–806, 842, 793, 873, 872, 853, 368, 343/777, 860; 455/550, 90, 89, 269, 73, 455/63.1, 575, 347
See application file for complete search history.

(56) References Cited

U.S. PATENT DOCUMENTS

| | | | |
|---|---|---|---|
| 3,721,989 A * | 3/1973 | Christensen | 343/701 |
| 4,717,920 A * | 1/1988 | Ohe et al. | 343/712 |
| 4,811,330 A * | 3/1989 | Ohe et al. | 455/272 |
| 4,816,837 A * | 3/1989 | Ohe et al. | 343/713 |
| 5,210,542 A * | 5/1993 | Pett et al. | 343/700 MS |
| 5,392,461 A * | 2/1995 | Yokoyama | 455/90.2 |
| 5,404,577 A * | 4/1995 | Zuckerman et al. | 455/66.1 |
| 5,548,643 A * | 8/1996 | Dalgleish et al. | 379/429 |
| 5,550,552 A * | 8/1996 | Oxley | 343/702 |
| 5,596,487 A * | 1/1997 | Castaneda et al. | 361/814 |
| 5,628,058 A * | 5/1997 | Hiraki | 455/90.3 |
| 5,644,320 A | 7/1997 | Rossi | |
| 5,682,299 A * | 10/1997 | Kunert | 361/816 |
| 5,708,458 A | 1/1998 | Vrbanac | |
| 5,708,833 A | 1/1998 | Kinney et al. | |
| 5,731,964 A * | 3/1998 | Kitakubo et al. | 361/816 |
| 5,777,856 A * | 7/1998 | Phillips et al. | 361/816 |
| 5,854,985 A | 12/1998 | Sainton et al. | |
| 5,898,909 A * | 4/1999 | Yoshihara et al. | 455/73 |
| 5,940,039 A | 8/1999 | Wang et al. | |
| 5,966,647 A | 10/1999 | Sawai | |
| 6,006,069 A | 12/1999 | Langston | |
| 6,023,147 A * | 2/2000 | Cargin et al. | 320/114 |
| 6,069,588 A | 5/2000 | O'Neill, Jr. | |
| 6,115,762 A | 9/2000 | Bell et al. | |
| 6,181,284 B1 | 1/2001 | Madsen et al. | |
| 6,191,586 B1 | 2/2001 | Bittar | |
| 6,204,825 B1 * | 3/2001 | Wilz | 343/841 |
| 6,215,449 B1 | 4/2001 | O'Neill, Jr. | |
| 6,236,366 B1 * | 5/2001 | Yamamoto et al. | 343/700 MS |
| 6,255,800 B1 | 7/2001 | Bork | |
| 6,278,864 B1 | 8/2001 | Cummins et al. | |
| 6,282,433 B1 | 8/2001 | Holshouser | |
| 6,314,277 B1 * | 11/2001 | Hsu et al. | 455/117 |
| 6,326,926 B1 | 12/2001 | Shoobridge et al. | |
| 6,329,949 B1 * | 12/2001 | Barnett et al. | 343/700 MS |

(Continued)

*Primary Examiner*—Douglas W. Owens
*Assistant Examiner*—Chuc Tran

(57) ABSTRACT

A wireless communication system comprising a radio module. The radio module comprises a radio transceiver and an antenna electrically coupled to the radio transceiver. The radio module may also comprise an electromagnetic shield disposed relative to the antenna to enable the antenna to transmit a radio signal to a location external to the electrical device without electromagnetic interference from within the electrical device.

21 Claims, 3 Drawing Sheets

U.S. PATENT DOCUMENTS

| | | | |
|---|---|---|---|
| 6,356,773 B1 * | 3/2002 | Rinot | 455/575.1 |
| 6,380,899 B1 | 4/2002 | Madsen et al. | |
| 6,392,900 B1 * | 5/2002 | Petty et al. | 361/816 |
| 6,417,817 B1 * | 7/2002 | Pirila et al. | 343/841 |
| 6,448,490 B1 | 9/2002 | Katz | |
| 6,504,710 B2 * | 1/2003 | Sutton et al. | 361/686 |
| 6,509,836 B1 | 1/2003 | Ingram | |
| 6,509,876 B1 | 1/2003 | Jones et al. | |
| 6,531,985 B1 * | 3/2003 | Jones et al. | 343/702 |
| 6,542,125 B1 * | 4/2003 | Hoffmeister et al. | 343/702 |
| 6,657,214 B1 * | 12/2003 | Foegelle et al. | 250/506.1 |
| 6,686,649 B1 * | 2/2004 | Mathews et al. | 257/659 |
| 6,738,650 B1 * | 5/2004 | Zhou et al. | 455/575.5 |
| 6,763,245 B1 * | 7/2004 | Satoh et al. | 455/550.1 |
| 6,785,519 B2 * | 8/2004 | Toyoda et al. | 455/90.1 |
| 6,801,170 B2 * | 10/2004 | Forrester et al. | 343/702 |
| 6,842,149 B2 * | 1/2005 | Taubman | 343/702 |
| 6,861,731 B2 * | 3/2005 | Buijsman et al. | 257/664 |
| 6,867,746 B2 * | 3/2005 | Mendolia et al. | 343/841 |
| 6,917,526 B2 * | 7/2005 | Ajioka et al. | 361/816 |
| 7,049,682 B1 * | 5/2006 | Mathews et al. | 257/660 |
| 2001/0022784 A1 | 9/2001 | Menon et al. | |
| 2001/0050643 A1 | 12/2001 | Egorov et al. | |
| 2002/0034263 A1 | 3/2002 | Schmidl et al. | |
| 2002/0098861 A1 | 7/2002 | Doney et al. | |
| 2002/0100660 A1 | 8/2002 | Stieber et al. | |
| 2002/0115457 A1 | 8/2002 | Koscal | |
| 2002/0135815 A1 | 9/2002 | Finn | |
| 2002/0142797 A1 | 10/2002 | Tarighi et al. | |
| 2002/0186758 A1 | 12/2002 | Vangala | |
| 2003/0013412 A1 | 1/2003 | Kardach et al. | |
| 2003/0017806 A1 * | 1/2003 | Sutono et al. | 455/59 |
| 2003/0050032 A1 | 3/2003 | Masaki | |
| 2003/0119459 A1 * | 6/2003 | Carillo et al. | 455/114 |
| 2003/0125070 A1 * | 7/2003 | Wagner et al. | 455/550 |
| 2005/0104782 A1 * | 5/2005 | Peled et al. | 343/702 |
| 2005/0288392 A1 * | 12/2005 | Okubora | 523/176 |

\* cited by examiner

WIRELESS COMMUNICATION SYSTEM

BACKGROUND

This section is intended to introduce the reader to various aspects of art which may be related to various embodiments of the present invention which are described and/or claimed below. This discussion is believed to be helpful in providing the reader with background information to facilitate a better understanding of various embodiments of the present invention. Accordingly, it should be understood that these statements are to be read in this light, and not as admissions of prior art.

Various electronic devices may be adapted to communicate with each other to form a system. For example, a home computer system may consist of a computer, a monitor, and various peripheral devices, such as a keyboard, mouse, printer, scanner, modem, etc. Typically, electrical cables are routed between the various devices and the computer to enable the various devices to communicate with the computer. However, many electrical devices are operable to communicate wirelessly using radio signals. Wireless communication provides great flexibility for movement of the devices and removes the difficulty of routing the cables between the devices. For example, a wireless modem may be coupled to the Internet and a portable computer provided with a corresponding wireless modem card to enable the portable computer to access the Internet wirelessly anywhere within a given radius from the wireless modem.

On a larger scale, computer networks, such as local area networks (LANs), generally include two or more computer systems or nodes that are linked together such that each of the nodes in the network can communicate and share data with the other nodes in the network. One type of LAN technology that may be implemented is the wireless local area network (WLAN) that uses high-frequency radio waves rather than wires to facilitate communication between the nodes. The network is more flexible without the need to route cables to each node in the WLAN. This benefit is particularly advantageous in situations where routing cables to certain node sites would be difficult or impractical.

Radio transmitters and receivers are frequently used in wireless communication systems to communicate data between electronic devices, such as a computers and server. Typically, the antenna of a radio module is tuned to produce a maximum output at a desired frequency. However, the antenna of the radio module may be affected by nearby components and materials, such as metals and di-electrics. For example, nearby components and materials may be coupled electromagnetically to the antenna, thereby changing the characteristics of the antenna. The effect that a component has on an antenna is known as "loading." Typically, there is some amount of loading on the antenna when the antenna is tuned to produce a maximum output. Varying the amount of loading on the antenna, such as by changing the components or materials near the antenna, may affect the output of the antenna. Consequently, the antenna may need to be re-tuned after changes are made in the components or materials near the antenna. If the antenna is not re-tuned, the radio may have a reduced output after changes are made to the loading on the antenna. Furthermore, a radio module having an antenna tuned to transmit a maximum output at a specific frequency when placed within one device may not transmit the signal with the same strength when placed inside another device having different components or a different arrangement of components because the components will have a different affect on the loading of the antenna. Thus, a radio module antenna may have to be tuned specifically for each device in which it is to be used or else the radio module may be operated in a degraded condition. In addition, the Federal Communications Commission (FCC) must certify electrical devices that produce radio signals. A radio module that is certified by the FCC is certified with a specific antenna and must be re-certified if the antenna is re-tuned.

A need exists for a radio module for an electronic device with an antenna that is not affected by the other components within the device. More specifically, a need exists for a radio module that does not have to be re-tuned and/or re-certified when changes are made to components within the device. In addition, a need exists for a radio module that does not have to be re-tuned and/or re-certified for use in each of a plurality of different electronic devices.

BRIEF DESCRIPTION OF THE DRAWINGS

Advantages of various embodiments of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Generally speaking, in accordance with embodiments of the present invention, techniques for improving the design, manufacture, and/or operation of a wireless communication system are described. In accordance with one embodiment, the antenna of a radio module capable of transmitting and receiving data wirelessly, such as by using high-frequency radio waves, is shielded from components of the electronic device disposed external to the radio module. By shielding the antenna from the external components, the external components have no substantial effect on the loading of the antenna of the radio module. Thus, the radio module does not have to be re-tuned or re-certified if there is a change in the components of the device external to the radio module because the change has no substantial effect on the loading of the antenna. Similarly, the same radio module may be disposed within electrical devices having different components near the radio module without affecting the output of the radio module. Consequently, the radio module would not have to be re-tuned or re-certified for use in a plurality of different electrical devices. A more detailed description of exemplary embodiments of the present invention is discussed below.

Figure 1:
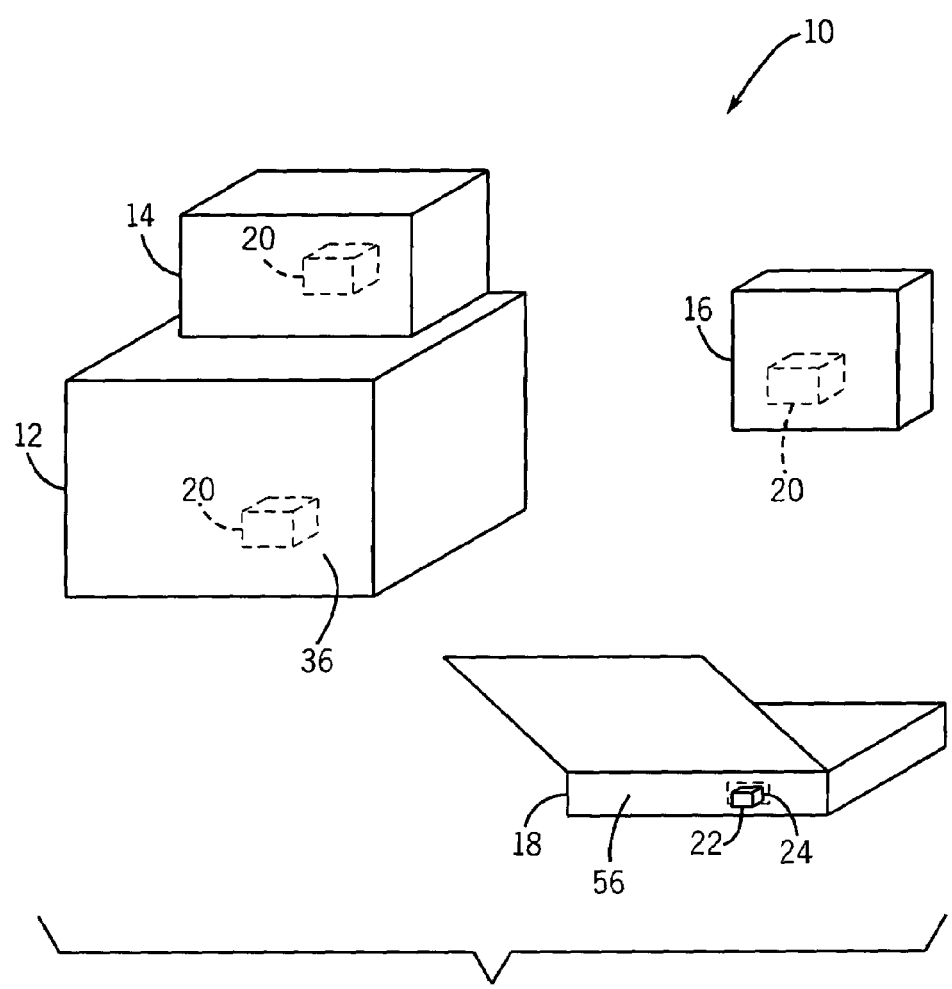
FIG. 1 is a perspective view of an a wireless communication system in accordance with an exemplary embodiment of the present invention.

Turning now to the drawings, and referring initially to FIG. 1, an exemplary wireless system 10 comprising a desktop computer 12, a monitor 14, a peripheral device 16, and a notebook computer 18 is illustrated. The desktop computer 12 has a processor, memory, programming instructions stored in memory, and an input/output ("I/O") device operable to couple data to and from the processor. The peripheral device 16 may be a printer, scanner, keyboard, mouse, etc. As can be appreciated, the network 10 may comprise a fewer or greater number of electronic devices and may include different types of devices, such as a personal digital assistant.

Data is communicated between the various electronic devices by radio signals. Radio modules are used to transmit and to receive the radio signals. In the illustrated embodiment, two embodiments of a radio module are utilized: a first radio module 20 and a second radio module 22. The first radio module 20 is adapted to be disposed within an electronic device, such as a desktop computer 12. The second radio module 22 is adapted to extend from within a device, such as a notebook computer 18, into the surrounding environment through an opening 24 in the device. However, a single embodiment of a radio module may be used, or many different embodiments of radio modules may be used. In addition, the radio modules 20 and 22 may be used in devices other than the ones in which they are illustrated. For example, the first module 20 may be used in the notebook computer 18. The radio modules 20 and 22 are adapted to operate in accordance with a common specification or protocol. In one embodiment, the radio modules 20 and 22 operate in accordance with the Bluetooth Specification. However, radio frequency (RF) specifications other than the Bluetooth Specification may be used.

Figure 2:
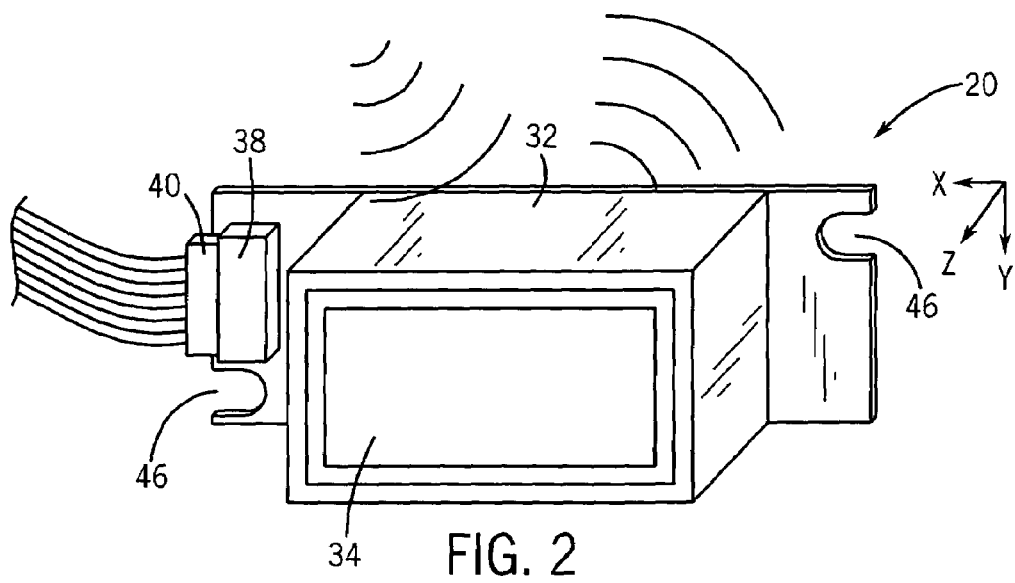
FIG. 2 is perspective view of a communication system module in accordance with an exemplary embodiment of the present invention.
Figure 3:
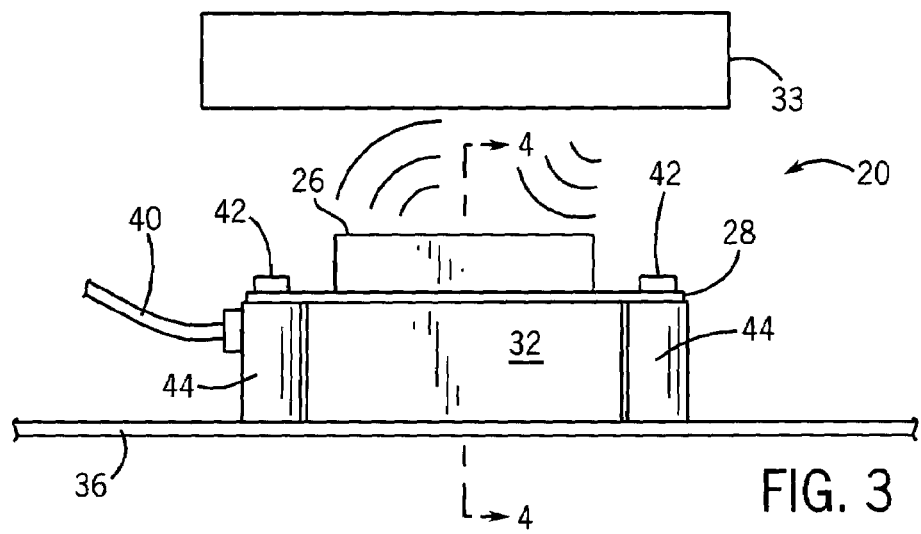
FIG. 3 is a plan view of the exemplary communication system module of FIG. 2.
Figure 4:
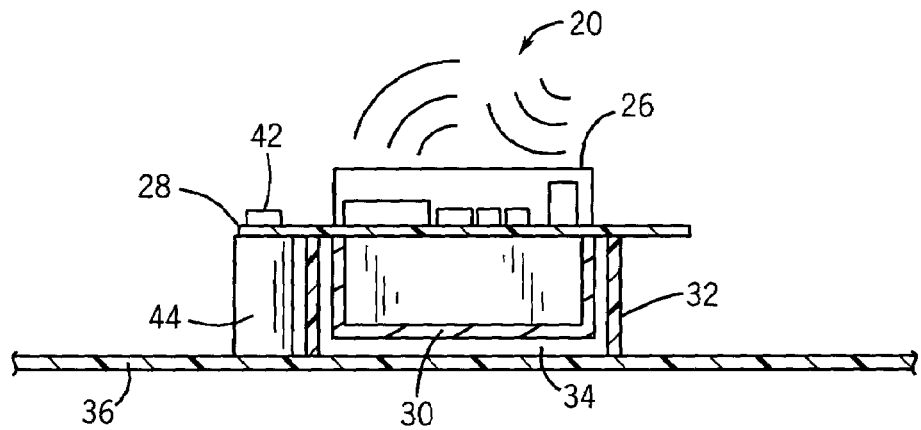
FIG. 4 is a cross-sectional view taken generally along line 4-4 of the exemplary communication system module of FIG. 3.

Referring generally to FIGS. 2-4, the exemplary illustrated radio module 20 includes a shielded radio transceiver 26 disposed on a printed circuit board 28. In the illustrated embodiment, an antenna 30 is mounted on the printed circuit board 28 and electrically coupled to the transceiver 26 through the printed circuit board 28. However, the antenna 30 may be etched onto the printed circuit board 28 or formed in some other manner. In addition, the radio transceiver 26 may be disposed on the opposite side of the printed circuit board 28 proximate the antenna 30. Furthermore, the radio transceiver 26 may be disposed separate from the antenna 30 and coupled to the antenna 30.

The radio module 20 may include an antenna housing 32 that is adapted to define the amount of loading on the antenna 30 so that the antenna 30 is not loaded by components 33 disposed within the desktop computer 14 external to the radio module 20. In this embodiment, the antenna housing 32 is fabricated of a conductively-coated plastic foam. In addition, the conductively-coated plastic foam isolates the antenna electromagnetically from the components 33 within the desktop computer 14 external to the radio module 20, thereby shielding the antenna 30 from undesirable noise produced by the components 33 within the desktop computer 14. The radio signals produced by the components 33 may be electrical noise produced as a result of electricity flowing through the components 33. The illustrated antenna housing 32 has an open side 34 that is disposed adjacent to a side 36 of the desktop computer 12 to enable radio signals to be transmitted and received by the antenna 30. In addition, the shielded radio transceiver 26 may also operate as an electromagnetic shield for the antenna 30. In addition, the printed circuit board 28 may also have a metal layer, such as a ground plane, that acts as an electromagnetic shield to isolate the antenna 30.

In the illustrated embodiment, the antenna housing 32 extends outward from the printed circuit board 28 around the perimeter of antenna 30. The antenna housing 32 defines a path for radio signals produced by the antenna 30 to be transmitted through the side 36 of the desktop computer 12 to radio modules in other devices, such as the notebook computer 18. Accordingly, the antenna housing 32 also defines the path for radio signals produced by other radio modules to be received by the antenna 30. Data is transmitted to and from the shielded radio transceiver 26 via an electrical connector 38 that is disposed on the printed circuit board 28. The electrical connector 38 is connected to a corresponding electrical connector 40 that is electrically coupled to electronic components within the desktop computer 12, such as the processor.

In the illustrated embodiment, the antenna housing 32 is secured to the printed circuit board 28. However, the antenna housing 32 may be secured to the enclosure, or another feature of the desktop computer 12, and the antenna 30 disposed within the antenna housing 32. In the illustrated embodiment, the printed circuit board 28 is attached to the side 36 of the desktop computer 12. However, the printed circuit board 28 may be attached to other portions of the desktop computer 12, and in other devices. The printed circuit board 28 is secured to the side 36 by threaded fasteners 42 that are threaded into stand-offs 44 secured to the side 36 of the desktop computer 12. The printed circuit board 28 has a plurality of notches 46 to enable the threaded fasteners 42 to pass through the printed circuit board 28.

Figure 5:
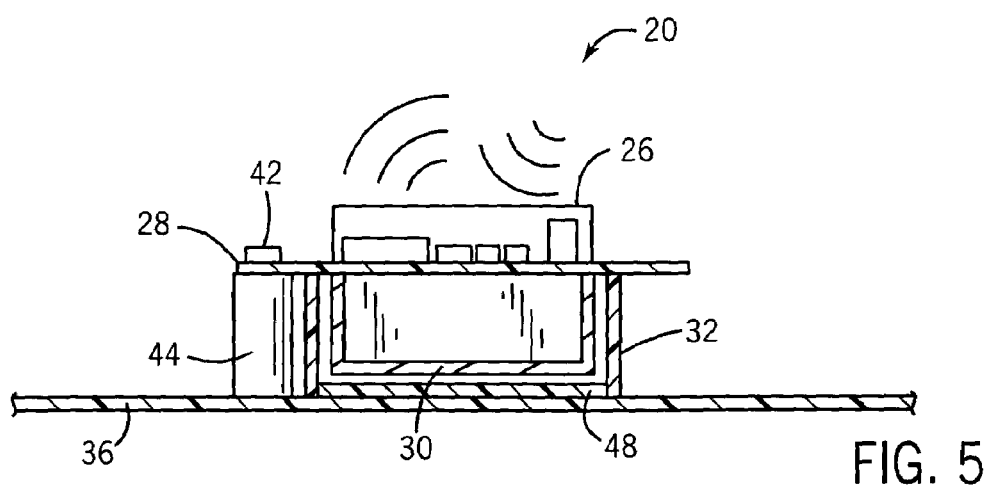
FIG. 5 is a cross-sectional view taken generally along line 4-4 of a communication system module in accordance with an alternative exemplary embodiment of the present invention.

Referring generally to FIG. 5, the antenna housing 32 may include a protective cover 48 that is disposed over the open end 34 of the antenna housing 32. The cover 48 is comprised of a material, such as plastic, that is generally transparent to radio frequency signals in the frequency band of the transceiver 26 and antenna 30. The protective cover 48 prevents entry of dirt and debris into the radio module 20, as well as protecting the antenna 30 from damage during handling.

Figure 6:
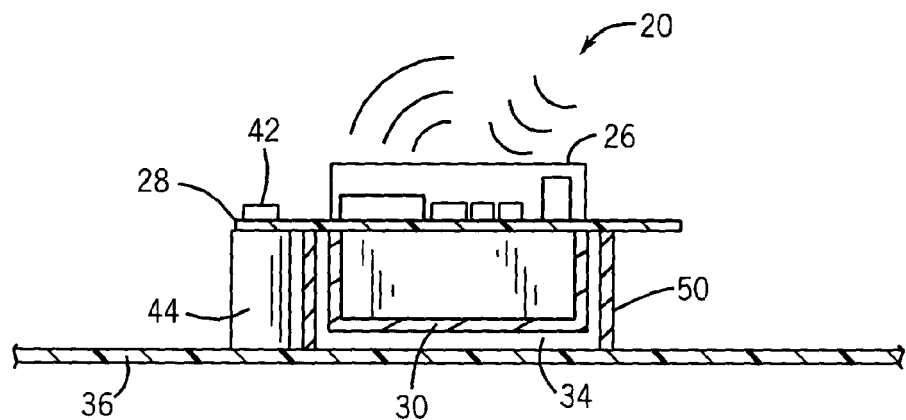
FIG. 6 is a cross-sectional view taken generally along line 4-4 of a communication system module in accordance with an alternative exemplary embodiment of the present invention.

Referring generally to FIG. 6, an alternative embodiment of an antenna housing 50 is illustrated. In this embodiment, the antenna housing 50 is comprised of a solid metal, rather than a conductively-coated plastic foam. The metal of the housing 50 acts as a shield to prevent the components within the device from loading the antenna 32, as well as shielding the antenna 30 from electrical noise produced within the desktop computer 12. However, the antenna housing 32 may be composed of a non-conductive material, such as a dielectric or a periodic band-gap material, operable to define the loading characteristics on the antenna.

Figure 7:
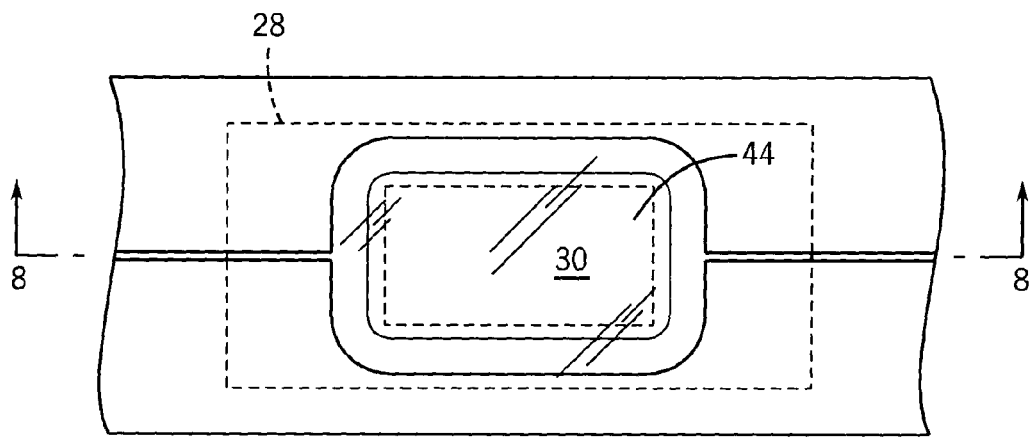
FIG. 7 is an elevational view of a communication system module implementing alternative exemplary embodiments of the present invention.
Figure 8:
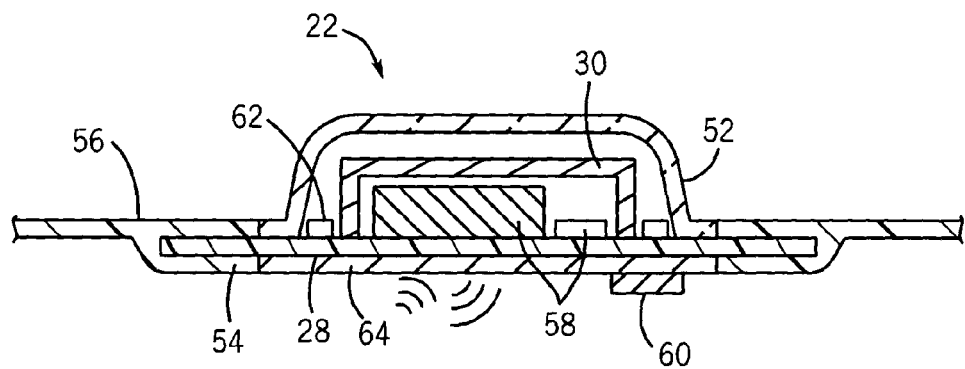
FIG. 8 is a cross-sectional view taken generally along line 4-4 of a communication system module in accordance with an alternative exemplary embodiment of the present invention.

Referring generally to FIGS. 7 and 8, the second radio module 22 is illustrated. As noted above, the second radio module 22 is adapted to extend into the surrounding environment through an opening 24 in the notebook computer 18, providing less interference to the transmission and reception of radio signals through the sides of the notebook computer 18. The second radio module 22 has a cover 52 that extends over the antenna 30. The cover 52 may be comprised of a material that is generally transparent to radio signals in the band used by the second radio module 22 to enable the antenna 32 to transmit radio signals to, and receive radio signals from, radio modules in other electronic devices. In the illustrated embodiment, flanges 54 are used to secure the printed circuit board 28 to the enclosure 56. In addition, because the perimeter of the antenna 30 is disposed through the opening 24, the enclosure 56 may act as a shield for components located peripherally to the antenna 30, rather than an antenna housing. In this embodiment, the flanges 54 and enclosure 56 are comprised of metal and act as a shield. However, a material that is generally transparent to radio signals also may be used for the flanges 54 and enclosure 56.

In this embodiment, the second radio module 22 has a radio transceiver 58 that is disposed on the side of the printed circuit board 28 in facing relationship to the enclosure 56. An electrical connector 60 is provided on the side of the printed circuit board 28 in facing relationship to the interior of the enclosure 56 to enable the radio transceiver 58 to be coupled to electronic components within the notebook computer 18. In this embodiment, the cover 52 may be transparent to light. The radio module 22 includes an LED 62 that is visible through the cover 52 to provide a visible external indication that the radio module 22 is operating.

In the illustrated embodiment, a conductive metal plate 64 is secured to the side of the printed circuit board 28 facing the interior of the enclosure 56. The metal plate 64 isolates the antenna 30 and radio transceiver 58 against components disposed within the notebook computer 18. Alternatively, the printed circuit board 28 may have a conductive layer extending across the printed circuit board 28 to act as a shield.

The various embodiments of the radio modules described above provide a radio module that is not substantially affected by the other components within the device. Therefore, the radio module does not have to be re-tuned and/or re-certified for use in each of a plurality of different electronic devices or that requires the radio module to be re-tuned and/or re-certified when changes are made to other electronic components within the device.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A radio module for an electrical device, comprising:
a radio transceiver;
an antenna electrically coupled to the radio transceiver; and
an electromagnetic shield disposed around the antenna to isolate the antenna from loading effects of components of the electrical device that are external to the radio module, wherein the radio transceiver operates as an electromagnetic shield for one side of the antenna and is externally located outside the electromagnetic shield that is disposed around the antenna.

2. The radio module, as set forth in claim 1, comprising a printed circuit board, wherein the antenna is disposed on the printed circuit board.

3. The radio module, as set forth in claim 2, wherein the shield comprises a metal plate coupled to the printed circuit board.

4. The radio module, as set forth in claim 2, wherein the shield is disposed relative to the transceiver to isolate the transceiver from electromagnetic interference from electrical components within the electrical device.

5. The radio module, as set forth in claim 2, wherein the radio module further comprises a cover disposed over the antenna and adapted to extend through an opening in the side of the electrical device, the cover comprising a material that is generally transparent to radio signals.

6. The radio module, as set forth in claim 1, wherein the shield comprises a housing disposed around the antenna, the housing having a portion generally transparent to radio signals from the antenna.

7. The radio module, as set forth in claim 6, wherein the housing is disposed around the transceiver.

8. The radio module, as set forth in claim 6, wherein the housing comprises a conductive metal.

9. The radio module, as set forth in claim 6, wherein the housing comprises a polymeric material having a conductive coating.

10. The radio module, as set forth in claim 6, wherein the housing comprises a periodic band-gap material.

11. A radio module in an electronic device, comprising:
a printed circuit board;
an antenna disposed on the printed circuit board;
an electromagnetic shield extending from the printed circuit board around the antenna to isolate the antenna from loading effects of components of the electronic device that are external to the radio module, wherein the radio module is coupled to an enclosure and the electromagnetic shield extends from the printed circuit board to the enclosure; and
a radio transceiver located outside the electromagnetic shield and adjacent to the antenna and providing an electromagnetic shield for the antenna.

12. The radio module, as set forth in claim 11, wherein the shield comprises a portion generally transparent to radio signals produced by the radio module, the portion being disposed in facing relationship with the antenna.

13. The radio module, as set forth in claim 11, wherein the antenna is disposed within the enclosure.

14. The radio module, as set forth in claim 13, wherein the radio module further comprises a cover disposed over the antenna, the cover being generally transparent to radio signals at the operating frequency of the radio module.

15. The radio module, as set forth in claim 11, wherein the shield comprises a metal plate disposed on the printed circuit board.

16. The radio module, as set forth in claim 15, wherein the metal plate is disposed on the side of the printed circuit board opposite the antenna.

17. A method of manufacturing a radio module for use within an electrical device, comprising:
tuning an antenna to produce a maximum output at a defined load;
disposing a shield around the antenna to establish the defined load on the antenna and to isolate the antenna from electrical noise generated by electrical components within the electrical device but external to the radio module; and
disposing a radio transceiver outside of the shield and adjacent to the antenna so the radio transceiver operates as an electromagnetic shield for the antenna.

18. The method, as set forth in claim 17, wherein disposing the shield comprises disposing an antenna housing around a perimeter of the antenna.

19. The method, as set forth in claim 17, wherein disposing the shield comprises disposing the antenna on a printed circuit board and disposing a conductive plate on the printed circuit board opposite the antenna.

20. The method, as set forth in claim 17, further comprising: fabricating the shield with a conductively-coated plastic foam.

21. The method, as set forth in claim 17, further comprising: fabricating the shield with an open side to enable radio signals to be transmitted to and received by the antenna.

* * * * *

UNITED STATES PATENT AND TRADEMARK OFFICE
CERTIFICATE OF CORRECTION

PATENT NO. : 7,671,803 B2 Page 1 of 1
APPLICATION NO. : 10/627316
DATED : March 2, 2010
INVENTOR(S) : Timothy Neill et al.

It is certified that error appears in the above-identified patent and that said Letters Patent is hereby corrected as shown below:

In column 6, line 1, in Claim 4, delete "claim 2," and insert -- claim 3, --, therefor.

In column 6, line 5, in Claim 5, delete "claim 2," and insert -- claim 3, --, therefor.

Signed and Sealed this

First Day of June, 2010

David J. Kappos
*Director of the United States Patent and Trademark Office*